Figure 1:
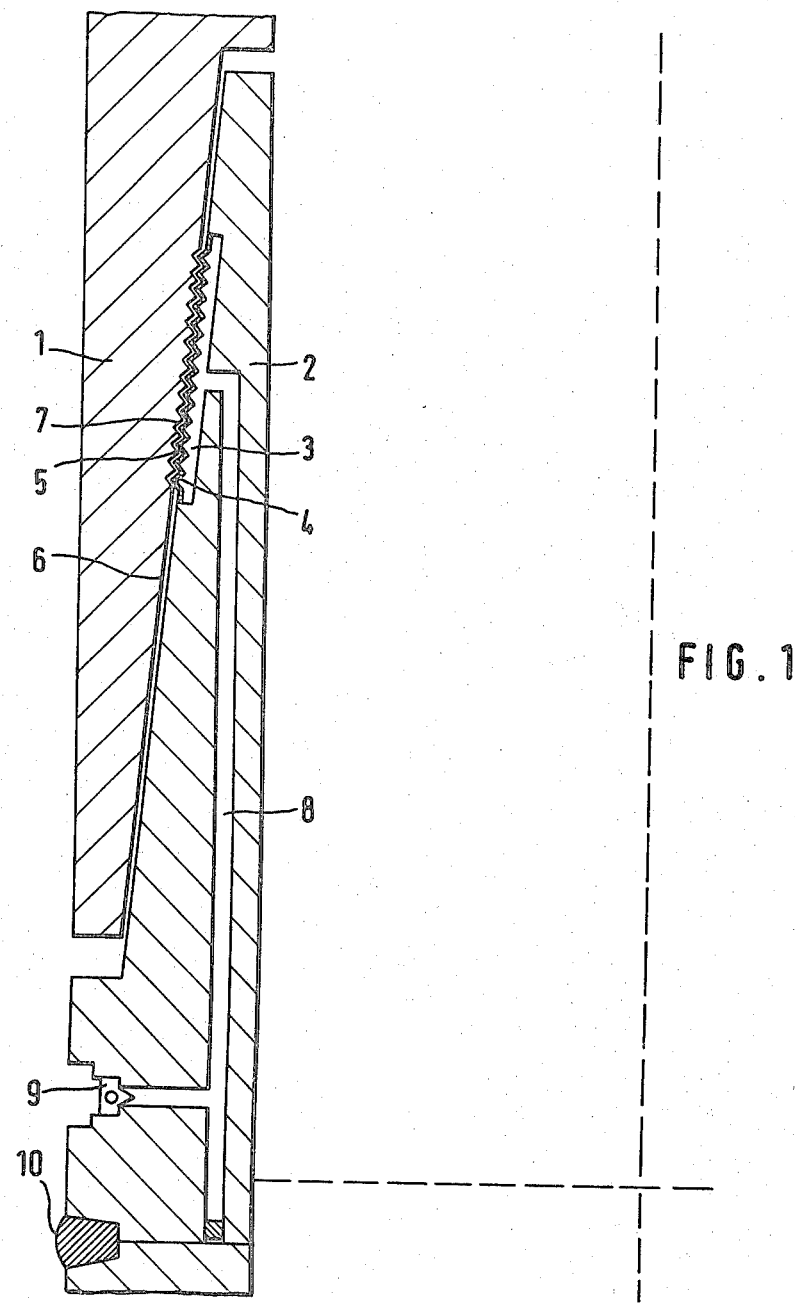

United States Patent [19]

Henn

[11] 4,402,532

[45] Sep. 6, 1983

[54] DETACHABLE PIPE JOINT

[76] Inventor: Günter Henn, Schrobenhausen, Fed. Rep. of Germany

[21] Appl. No.: 218,179

[22] Filed: Dec. 19, 1980

[30] Foreign Application Priority Data

Dec. 20, 1979 [DE] Fed. Rep. of Germany ....... 2951354

[51] Int. Cl.³ .............................. F16L 17/00
[52] U.S. Cl. ...................... 285/18; 285/96; 285/106; 285/332.3
[58] Field of Search ............... 285/18, 97, 96, 106, 285/332, 107, 100, 332.1, 332.3, 333; 277/34.3

[56] References Cited

U.S. PATENT DOCUMENTS

| 1,914,741 | 6/1933 | Gysling | 285/96 X |
| 2,015,081 | 9/1935 | McElhany et al. | 285/97 X |
| 2,083,842 | 6/1937 | Henning | 285/97 X |
| 2,827,312 | 3/1958 | Spencer | 285/97 X |
| 3,023,995 | 3/1962 | Hopkins | 285/97 X |
| 3,033,594 | 5/1962 | Cushman | 285/97 |
| 3,114,566 | 12/1963 | Coberly et al. | 285/18 X |
| 3,215,454 | 11/1965 | Hayes | 285/96 X |
| 3,944,263 | 3/1976 | Arnold | 285/96 |
| 4,276,945 | 7/1981 | Ward, Sr. | 285/97 X |

FOREIGN PATENT DOCUMENTS

| 6982 | 9/1879 | Fed. Rep. of Germany | 285/97 |
| 2429957 | 2/1980 | France | 285/97 |
| 343724 | 2/1960 | Switzerland | 285/96 |
| 494402 | 10/1938 | United Kingdom | 285/97 |
| 540101 | 12/1976 | U.S.S.R. | 285/97 |

Primary Examiner—Thomas F. Callaghan
Attorney, Agent, or Firm—Kenyon & Kenyon

[57] ABSTRACT

A detachable pipe joint of the type having conical male and female parts has a recess in one of the parts covered by an expansible hard material, the recess being connected with a hole to which a high pressure fluid can be applied so as to expand the hard covering and provide a firm joint.

4 Claims, 1 Drawing Figure

DETACHABLE PIPE JOINT

The subject of the invention is a joint of a sleeve and a plug, which is easy to make and release again. The invention is particularly well suited for joining and disengaging casing pipe.

The classical detachable joint for casing pipe is the threaded-pipe joint. For underground work, it has considerable disadvantages, however. The threads are subjected to heavy wear because the thread grooves are easily fouled by drill chips. Thereby, the threads often seize to such an extent that the joint can no longer be disengaged, or only with great effort. On the other hand, a threaded joint is easily detached if the casing pipe is turned in the opposite direction. This is a particular disadvantage if the drilling head at the ground end must be rotated against the direction of rotation, since with multi-section casing pipe the rotation in the counter-direction is not transmitted to the drilling head if a threaded joint between two pipe sections becomes loose. It is, finally, a disadvantage in threaded joints of pipe sections that it takes relatively much time and technical effort to make and disengage especially joints with long threads.

It is an object of the invention to find a reliable connection between casing pipe sections which overcomes the disadvantages, especially the sensitivity to wear of the threads and the danger of seizing of the connection, and can easily be made and released again, while utilizing the advantages of a threaded joint, namely, the high tensile strength which results from the multiple-shoulder effect of the turns.

The solution of the problem consists of a joint between a conical sleeve and a conical plug, in which at least one annular recess, which is connected via a hole to an opening at the outside surface of the sleeve or of the plug outside of the region of the intended joint and is closed off by a valve, is provided with a hard covering which is expandable under high pressure and the surface area of which is larger than the area resulting from the length times the height.

To increase the adhesion between the sleeve and the plug, also the area of the sleeve or the plug which corresponds to the covering of the recess, is preferably provided with a surface which is larger than the area resulting from length times height.

The annular surfaces are preferably provided with ribs and grooves which extend at right angles to the longitudinal axis of the sleeve or the plug.

For covering the annular recess at the inside surface of the sleeve or the outside surface of the plug, a steel band is preferably used, which is provided with endless, lengthwise-extending hardened ribs.

To explain the invention, reference is made to an embodiment example which is shown in the attached drawing.

FIG. 1 shows a longitudinal section through the wall of a casing pipe consisting of two pipe sections connected to each other in accordance with the invention.

The joint consists of a sleeve 1 of a pipe section, which is conical on the inside, and a plug 2 of a further pipe section, which is conical on the outside.

The plug 2 is provided at the outside surface of its conical region with an annular recess 3 which is closed off by a welded-on covering 4. The covering 4 consists of a hardened steel band which is provided with parallel ribs 5. The inside surface 6 which corresponds to the covering 4, of the sleeve 1 is provided with ribs 7 which extend likewise parallel and correspond to the ribs 5.

The recess 3 is connected to the outside wall of the plug 2, in which a valve 9 is arranged, via a bore hole 8 which is filled with a hydraulic medium, for instance, grease or oil/water. The plug 2 sits on the end of the pipe section, connected thereto by a welded seam 10.

To connect the pipe sections, the upper pipe section is placed with its sleeve 1 on the lower pipe section, which is provided with the plug 2. Then, a grease gun is set on the valve 9 and grease is pushed into the bore hole under high pressure. Under the pressure of the medium, the covering 4 expands in such a manner that the ribs 5 are pressed into the grooves 7 of the inside surface 6 of the sleeve 1.

To release the connection, the hole 8 is pressure-relieved via the valve 9 and the lower pipe section with the plug 2 is pulled out of the sleeve 1.

It has been found that pulling forces of 40 tons could be exerted on the joint when steel pipes with an outside diameter of 220 mm and a wall thickness of 25 mm were used as well as steel band 2 mm thick and 50 mm wide, with the counter-surface of the sleeve not grooved.

I claim:

1. Detachable pipe joints consisting of a pipe end with a sleeve which is conical on the inside and a pipe end with a plug conical on the outside, characterized by the feature that the inside surface of the sleeve (1) or the outside surface of the plug (2) is provided with at least one annular recess (3) which is connected via a hole (8) to an opening on the outside surface of the sleeve (1) or of the plug (2) outside of the region of the joint and which is closed off by a valve (9), and the recess (3) is provided with a hard covering (4) which is expandable under high pressure and the surface area of which is larger than the area resulting from length times height.

2. Detachable pipe joint according to claim 1, characterized by the feature that the area of the sleeve (1) or the plug (2) corresponding to the covering (4) of the recess (3) is provided with a surface which is larger than the area resulting from length times height.

3. Detachable pipe joint according to claim 2, characterized by the feature that the corresponding annular surfaces of the sleeve (1) and the plug (2) are provided with ribs (5) and grooves (7) which extend at right angles to the longitudinal axis.

4. Detachable pipe joint according to claim 3, characterized by the feature that a steel band which is provided with endless hardened ribs (5) is used as the covering (4) of the recess (3).

* * * * *